United States Patent [19]

Yokoyama et al.

[11] Patent Number: 4,770,778

[45] Date of Patent: Sep. 13, 1988

[54] HOLLOW FIBER SEMIPERMEABLE MEMBRANE ELEMENT AND A METHOD OF PRODUCING THE SAME

[75] Inventors: Takayuki Yokoyama; Takashi Ogawa, both of Fuji; Nobuatsu Watanabe, Nagaokakyo; Kazuo Toyomoto, Yokohama, all of Japan

[73] Assignee: Asahi Kasei Kogyo Kabushiki Kaisha, Osaka, Japan

[21] Appl. No.: 120,175

[22] Filed: Nov. 12, 1987

Related U.S. Application Data

[63] Continuation of Ser. No. 802,263, Nov. 27, 1985, abandoned.

[30] Foreign Application Priority Data

Nov. 29, 1984 [JP] Japan .................................. 59-250447
Aug. 23, 1985 [JP] Japan .................................. 60-183900

[51] Int. Cl.⁴ .............................................. B01D 13/01
[52] U.S. Cl. ........................... 210/321.79; 428/373; 428/375; 428/376; 428/390; 428/394; 428/398; 210/500.23; 210/321.69; 210/500.21
[58] Field of Search .............. 428/373, 375, 376, 390, 428/398, 394; 200/500.21, 500.23, 321.1–321.4

[56] References Cited

U.S. PATENT DOCUMENTS

| | | | |
|---|---|---|---|
| 2,433,546 | 12/1947 | Cornelius | 18/59 |
| 3,315,740 | 4/1967 | Withers | 165/172 |
| 3,423,491 | 1/1969 | McLain et al. | 210/500.23 |
| 3,658,976 | 4/1972 | Slade | 264/105 |
| 4,035,459 | 7/1977 | Kesting | 428/398 |
| 4,211,602 | 7/1980 | Brumfield | 428/376 |
| 4,214,020 | 7/1980 | Ward et al. | 210/500.21 |
| 4,231,877 | 11/1980 | Yamauchi et al. | 210/500.23 |

FOREIGN PATENT DOCUMENTS

| | | | |
|---|---|---|---|
| 190604 | 11/1982 | Japan | 210/500.23 |
| 90004 | 5/1985 | Japan | 210/500.21 |
| 147202 | 8/1985 | Japan | 210/500.23 |
| 206414 | 10/1985 | Japan | 210/500.23 |

OTHER PUBLICATIONS

Pamphlet of Central Glass Company, Ltd., Japan.
N. Watanabe, Two Types of Graphite Fluorides, Solid State Ionics, 1, (1980), 87–110.

*Primary Examiner*—Sharon A. Gibson
*Attorney, Agent, or Firm*—Finnegan, Henderson, Farabow, Garrett & Dunner

[57] ABSTRACT

There is disclosed a hollow fiber semipermeable membrane element comprising hollow fiber semipermeable membranes having their respective one end portions or both end portions bonded together by means of a vulcanized rubber, so that the semipermeable membrane element has a high resistance to chemicals. The incorporation of a graphite fluoride in the rubber serves to further increase not only the hardness of the bonding rubber portions but also the resistance of the bonding rubber portions to chemicals. Such a semipermeable element can be easily, efficiently produced on a commercial scale.

2 Claims, 3 Drawing Sheets

HOLLOW FIBER SEMIPERMEABLE MEMBRANE ELEMENT AND A METHOD OF PRODUCING THE SAME

This application is a continuation of application Ser. No. 802,263, filed Nov. 27, 1985, now abandoned.

This invention relates to a hollow fiber semipermeable membrane element and a method of producing the same. More particularly, the present invention is concerned with a hollow fiber semipermeable membrane element which comprises hollow fiber semipermeable membranes having their respective one end portions or both end portions bonded together by means of a vulcanized rubber, so that the semipermeable membrane element has a high resistance to chemicals. The present invention is also concerned with a method of producing such a hollow fiber semipermeable membrane element.

Modules in which hollow fiber semipermeable membranes are incorporated are widely used because they are large in effective membrane area and, therefore, economically advantageous, as compared with modules of the pleat, spiral and tubular types. However, the conventional modules of the hollow fiber semipermeable membrane type have drawbacks. Illustratively stated, in assembling the hollow fiber semipermeable membranes into a module, it is necessary to seal, by means of an adhesive, spacings between the semipermeable membranes as well as between the semipermeable membranes and the inner wall of a housing, at their respective one end portions or both end portions. As the adhesive, there are usually used those of an epoxy type. However, because of poor resistance of epoxy type adhesives to chemicals, the modules in which the sealing is made by means of an epoxy type adhesive cannot be suitably employed not only for the filtration of strong acids such as concentrated sulfuric acid, nitric acid, glacial acetic acid, etc. used for washing of semiconductors or etching procedures, but also for the filtration of organic solvents such as methanol, trichloroethylene, isopropyl alcohol, acetone, methyl ethyl ketone, ethyl acetate, etc. On the other hand, fluoro resins and fluoro rubbers are known to have a resistance to chemicals, however, any attempt to use such fluoro resins or fluoro rubbers as the adhesives for constructing modules of the hollow fiber semipermeable membrane type has not been made because fluoro resins and fluoro rubbers have a high viscosity and poor flowability even at high temperatures.

Accordingly, it is one object of the present invention to provide a hollow fiber semipermeable membrane element, which is excellent in resistance to chemicals when it is constructed into a module.

It is another object of the present invention to provide a method of producing a hollow fiber semipermeable membrane element of the kind described above, which can be easily carried out.

The foregoing and other objects, features and advantages of the present invention will be apparent to those skilled in the art from the following detailed description and appended claims taken in connection with the accompanying drawings in which:

Figure 5:
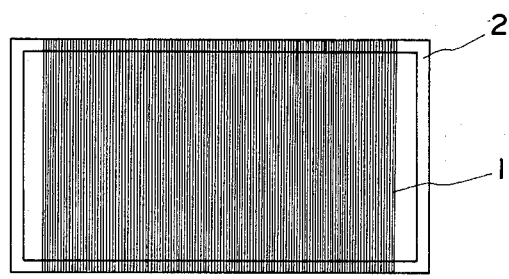
Figure 6:
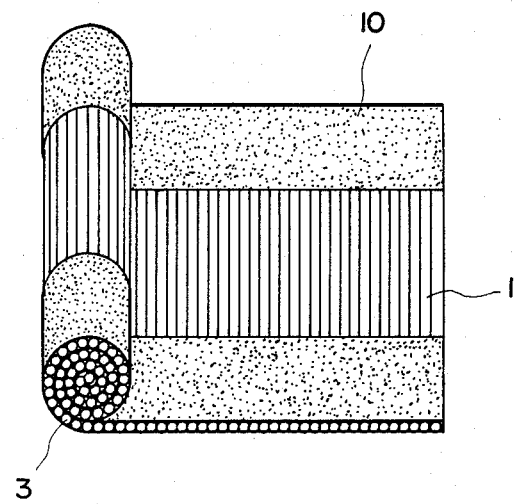

FIG. 5 is a diagrammatic front view illustrating another procedure for coating the end portions of hollow fiber semipermeable membranes with an unvulcanized rubber; and FIG. 6 is a diagrammatic perspective view illustrating how a sheet composed of hollow fiber semipermeable membranes having their both end portions bonded together which is obtained through the procedure of FIG. 5 is rolled to form a bundle.

In FIGS. 1 through 6, like parts or portions are designated by like numerals.

According to the present invention, there is provided a hollow fiber semipermeable membrane element comprising a vast plurality of hollow fiber semipermeable membranes substantially equal in length, arranged in a lengthwise direction and bonded together by means of a vulcanized rubber at their respective one end portions or both end portions.

Figure 1:
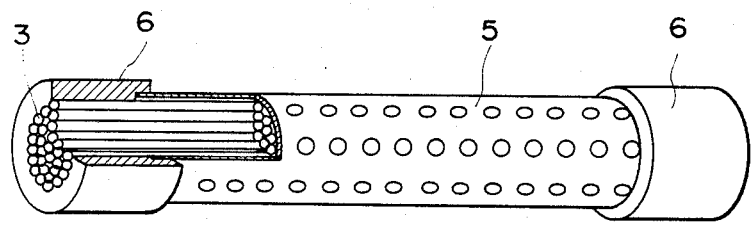
FIG. 1 is a diagrammatic perspective view of one form of a hollow fiber semipermeable membrane element embodying the present invention, which is partly cut-away to show the internal structure.
Figure 2:
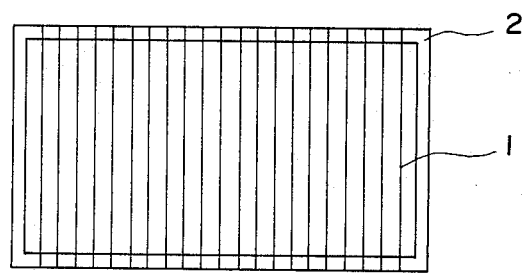
FIGS. 2 and 3 are diagrammatic front and side views illustrating a procedure of coating the end portions of hollow fiber semipermeable membranes with an unvulcanized rubber.
Figure 3:
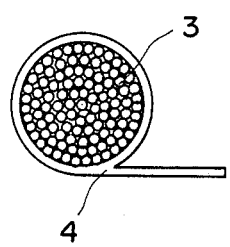

Referring to FIG. 1, there is shown one form of a hollow fiber semipermeable membrane element of the present invention. FIGS. 2 to 3 illustrate how to prepare a bundle of hollow fiber semipermeable membranes having their end portions coated and bonded together by means of an unvulcanized rubber, which bundle is to be used for forming a hollow fiber semipermeable membrane element of the present invention. In FIG. 2, predetermined lengths of hollow fiber semipermeable membranes are attached to a frame 2 made of stainless steel through a double-coated adhesive tape. The upper side of the frame 2 having the membranes 1 attached thereto is dipped in a solution containing an unvulcanized rubber, followed by drying. This operation is repeated several times to form a unvulcanized rubber coat at one end portions of the membranes 1. The lower side of the frame 2 is also treated in the same manner as mentioned above to form a unvulcanized rubber coat at the other end portions of the membranes 1. The membranes 1 are cut at their respective portions inside the upper and lower sides of the frame 2 to obtain a vast plurality of hollow fiber semipermeable membranes 1 having their both end portions coated with an unvulcanized rubber (not shown). The thus obtained membranes 1 are bundled, with their both ends arranged uniformly, into a cylindrical form. Around the cylindrical membrane bundle 3 at its both end portions coated with the unvulcanized rubber is wound an unvulcanized rubber sheet 4, to form a cylindrical membrane bundle assembly as depicted in FIG. 3. Referring back to FIG. 1, the thus obtained cylindrical membrane bundle assembly is fittedly inserted in a perforated pipe 5 having a length a little smaller than that of the cylindrical membrane bundle assembly so that the both end portions of the cylindrical membrane bundle assembly protrude out of the both ends of the pipe 5. Around the protruded both end portions of the cylindrical membrane bundle assembly and the both end portions of the pipe are wound unvulcanized rubber sheets 6, 6 which are the same as the sheet 4, and is then subjected to vulcanization of the unvulcanized rubber in an oven while being pressed in a mold made of, for example, polytetrafluoroethylene. After the vulcanization, the both ends of the hollow fiber semipermeable membranes are cut to open the both ends. Thus, there is obtained a hollow fiber semipermeable membrane element of the present invention. The form of a hollow fiber semipermeable membrane and the method of producing the same are not limited to those described above, and various modifications and variations are possible as will be described later with reference to the other embodiments.

In the present invention, as the hollow fiber semipermeable membrane, there may be employed any of those which are conventionally known and have various pore sizes and various fiber diameters and are made of various materials. But, from a view point of resistance to chemicals, those membranes made of fluoro resins, silicone resins, polyolefin resins, polyimide resins, polyacrylonitrile resins, polyamide resins, and the like are preferred.

As the unvulcanized rubber, there may be employed any of those which are soluble in a solvent and will give an excellent property rubber after vulcanization. Example of the suitable unvulcanized rubber include fluoro rubbers such as a vinylidene fluoride-hexafluoropropylene copolymer, a vinylidene fluoride-hexafluoropropylene-tetrafluoroethylene terpolymer, and a tetrafluometylene-propylene copolymer; polyolefin rubbers such as an ethylene-propylene-diene monomer (EPDM) and ethylene-propylene monomer (EPM); and silicone rubbers. Most preferred are fluoro rubbers.

As a vulcanizing agent, there may be employed any of those which are capable of vulcanizing the unvulcanized rubbers, and may generally be used organic peroxides, polyols, and amines. Suitable vulcanizing agents are chosen depending on the kind of an unvulcanized rubber used. The vulcanizing agent may be employed in an amount of 1 to 10 parts by weight per 100 parts by weight of the unvulcanized rubber.

Further, suitable additives such as a reinforcing agent, vulcanizing accelerator, plasticizer and processing aid may be incorporated in an unvulcanized rubber.

As the reinforcing agent for increasing the mechanical strength of the sealing rubber, including the hardness of rubber, there may be employed those which are excellent in resistance to chemicals, such as carbon black and a graphite fluoride. The reinforcing agent may be employed in an amount of 1 to 100 parts by weight per 100 parts by weight of the unvulcanized rubber, namely, after vulcanized, 1 to 100% by weight based on the weight of the rubber value of the vulcanized rubber. If the amount of the reinforcing agent is less than 1% by weight, the intended effect cannot be exerted. On the other hand, if the amount of the reinforcing agent is more than 100% by weight, the flowability of the rubber is decreased, so that in vulcanizing the unvulcanized rubber while pressing it, gaps tend to be formed between the rubber and the hollow fiber semipermeable membranes, leading to insufficient sealing.

Of the various kinds of reinforcing agents, a graphite fluoride is most preferred. By the incorporation of a graphite fluoride into a rubber, not only can be attained the reinforcing effect on the rubber, but also the chemicals-resistance of the rubber is extremely increased. A graphite fluoride is obtained by direct fluorination of a carbon material, but the composition of a graphite fluoride formed by the fluorination of a carbon material is widely varied depending on the reaction temperature and the kind or crystallinity of the raw carbon material. $(CF)_n$ may be produced by reacting an amorphous carbon material, such as petroleum coke, with fluorine at a temperature of about 200° C. to about 450° C., and $(CF)_n$ or $(CF)_n$-rich mixtures of $(CF)_n$ and $(C_2F)_n$ may be produced by reacting a crystalline carbon material, such as natural and artificial graphites, with fluorine at a temperature of about 500° C. to about 630° C. Compounds of $(CF)_n$ are produced with varied crystallinities, and those having high crystallinities are white solids. On the other hand, $(C_2F)_n$ or $(C_2F)_n$-rich mixtures of $(C_2F)_n$ and $(CF)_n$ may be produced by reacting a crystalline carbon material, such as natural and artificial graphites, with fluorine at a temperature of about 300° C. to about 500° C. The color of $(C_2F)_n$ is black under the conditions for the formation thereof and changes from black through grey to white by heat treatment thereof at an elevated temperature up to about 600° C. with increase of crystallinity. When a natural graphite is used as a raw material, the resulting graphite fluoride product is $(CF)_n$-rich in the event that the fluorination is conducted at a temperature higher than about 500° C., whereas it is $(C_2F)_n$-rich in the event that the fluorination is conducted at a temperature up to about 500° C. The higher the temperature, the more the $(CF)_n$ content of the product, whereas the lower the temperature, the more the $(C_2F)_n$ content of the product. The same also applies with respect to an artificial graphite material except that the boundary temperature is not about 500° C. but 470° C. With respect to further information on a graphite fluoride, reference may be made, for example, to N. Watanabe, Solid State Ionics, Vol. 1, No. 1, 2, pages 87–110 (1980). In the present invention, a graphite fluoride having any F/C ratio may be employed, however, from a viewpoint of the increased effect, a graphite fluoride with a F/C ratio of substantially 1:1 is preferred. It is preferred to use a graphite fluoride having a particle size of 0.1 to 2 μm.

With respect to the production of a hollow fiber semipermeable membrane element of the present invention, some explanation has already been given with reference to FIGS. 1 to 3 in which a certain specific embodiment is shown. Hereinbelow is given a general description of the production of the present hollow fiber semipermeable membrane element.

One end portions or both end portions of hollow fiber semipermeable membranes are dipped in a solution of unvulcanized rubber containing a vulcanizing agent to coat the peripheral walls of the end portions of the membranes.

The length of the end portions to be coated is preferably 10 mm or more. If such a length is smaller than 10 mm, the open ends of the membranes of the resulting membrane element are caused to collapse even under the low pressure which is applied to the element in actual use, so that the filtration pressure to be applied is restricted. On the other hand, the larger the length of the end portions to be coated, the more the pressure resistance of the element, but the less the effective membrane area. For this reason, the length of the end portions to be coated should be appropriately determined depending on the diameter of the element and the filtration pressure to be used.

As the solvent for making a solution of unvulcanized rubber containing a vulcanizing agent, there may be employed any of those which are good solvents for the unvulcanized rubber containing the vulcanizing agent and non-solvents for the hollow fiber semipermeable membranes. The concentration of the solution may preferably be 10 to 50% by weight. If the concentration is less than 10% by weight, the number of times of repetition of dipping and drying for obtaining the desired thickness of a coating is increased and, in addition, a long period of time is required. On the other hand, if the concentration is more than 50% by weight, the thickness of a coating becomes too large, causing the number of hollow fiber semipermeable membranes in the membrane element to be reduced, which leads to a decrease in effective membrane area.

The thus obtained coated membranes are dried at a temperature lower than the vulcanizing point of the unvulcanized rubber to obtain a dried coating of a thickness of 0.05 to 10 mm, preferably 0.1 to 5 mm. If the thickness of the coating is less than 0.05 mm, the sealing between the hollow fiber semipermeable membranes will be insufficient after vulcanization is effected while pressing a bundle of the coated semipermeable membranes in a mold. On the other hand, if the thickness of the coating is more than 10 mm, when vulcanization is effected while pressing a bundle of the coated semipermeable membranes in a mold, the vulcanized rubber tends to be forced out of the bundle and the effective membrane area per unit module is caused to be disadvantageously decreased.

A vast plurality of the thus obtained hollow fiber semipermeable membranes having their end portions coated with the unvulcanized rubber are bundled, with their both ends arranged properly, into a cylindrical form. Around the cylindrical membrane bundle at its end portion coated with the unvulcanized rubber is wound an unvulcanized rubber film or sheet to form a cylindrical membrane bundle assembly. The thus obtained cylindrical membrane bundle assembly is subjected to vulcanization of the unvulcanized rubber in an oven while being pressed, to an extent that the diameter of the bundle is reduced by about 10%, in a heated split mold. The oven is operated with an appropriate atmosphere for the kind of the rubber used, such as in vacuum, or with a nitrogen or steam atmosphere.

In the embodiment shown in FIGS. 1 to 3, as described before, predetermined lengths of hollow fiber semipermeable membranes are attached, one by one, to a frame 2 made of stainless steel through a double-coated adhesive tape. An upper side of the frame 2 having the membranes 1 attached thereto is dipped in a solution containing an unvulcanized rubber, followed by drying. This operation is repeated several times to form an unvulcanized rubber coat at one end portions of the membranes 1. The lower side of the frame 2 is also treated in the same manner as mentioned above to form an unvulcanized rubber coat at the other end portions of the membranes 1. The membranes 1 are cut at their respective portions inside the upper and lower sides of the frame 2 to obtain a vast plurality of hollow fiber semipermeable membranes 1 having their both end portions coated with an unvulcanized rubber (not shown). The thus obtained membranes 1 are bundled, with their both ends arranged uniformly, into a cylindrical form. The procedure as mentioned above is somewhat troublesome.

There is another method of preparing a cylindrical membrane bundle composed of hollow fiber semipermeable membranes with their both ends arranged properly. Referring to FIG. 5, a hollow fiber semipermeable membrane 1 is wound around a frame 2 over its upper and lower sides so that the hollow fiber semipermeable membranes 1 are densely arranged substantially in parallel at predetermined intervals. The frame 2 with the membrane wound therearound is dipped from its upper side in a solution of an unvulcanized rubber containing a vulcanizing agent to a necessary depth, thereby to coat one end portions of the semipermeable membranes with the unvulcanized rubber, followed by drying at a temperature lower than the vulcanizing point of the rubber used. With respect to the lower side of the frame 2, the same treatment is effected to coat the other end portions of the semipermeable membranes with dried unvulcanized rubber. The membranes 1 are cut at their respective portions inside the upper and lower sides of the frame 2 to obtain a sheet-like form of a vast plurality of hollow fiber semipermeable membranes bonded together at their both end portions by means of the dried unvulcanized coating rubber 11. By rolling the sheet-like hollow fiber semipermeable membranes as illustrated in FIG. 6, a cylindrical membrane bundle composed of semipermeable membranes of which the both end portions are properly arranged can be obtained in a shortened period of time with advantages.

The thus obtained cylindrical membrane bundle composed of semipermeable membranes with their end portions coated with the unvulcanized rubber is subjected to vulcanization of the unvulcanized rubber as described above, thereby to obtain a hollow fiber semipermeable membrane element of the present invention. The semipermeable membrane element is accommodated in a housing made of polytetrafluoroetylene, which has a resistance to chemicals, (hereinafter often referred to as "PTFE") or the like and sealed by means of an O-ring made of a fluoro resin or the like which is also resistant to chemicals, thus providing a semipermeable module which is excellent in resistance to chemicals. In the module thus constructed, the bonding portions are made of rubber and, therefore, there is a danger that the bonding portions are deformed when a high pressure is applied. In order to avoid such deformation or distortion, a suitable reinforcement such as a pipe or rod made of a fluoro resin which is resistant to chemicals may preferably be inserted in the module, for example, within the semipermeable membrane element.

The hollow fiber semipermeable membrane elements of the present invention have an extremely high resistance to chemicals as compared to the conventional membrane elements in which an epoxy resin is used as the sealing material. Moreover, the sealing portions of the present membrane element have rubber resiliency and, therefore, sealing between the membrane element and a housing for accommodating the membrane element can be easily performed by means of an O-ring or the like.

The present invention will be illustrated in more detail with reference to the following Examples that should not be construed as limiting the scope of the invention.

EXAMPLE 1

VITON GF (tradename of a fluoro resin produced and sold by E. I. Du Pont, U.S.A.) was dissolved in methyl ethyl ketone (hereinafter referred to as "MEK") at a weight ratio of 15:100 (VITON GF : MEK). In the resulting solution were dissolved, in terms of weight parts per 100 weight parts of the VITON GF, 2 weight parts of PERHEXA 2.5B (produced and sold by Nihon Yushi K.K., Japan) as a vulcanizing agent, 5 weight parts of triallyl isocyanurate, and 15 weight parts of MT-CARBON BLACK (tradename of carbon black produced and sold by Tokai Carbon K.K., Japan) to obtain a solution of an unvulcanized rubber.

Figure 4:
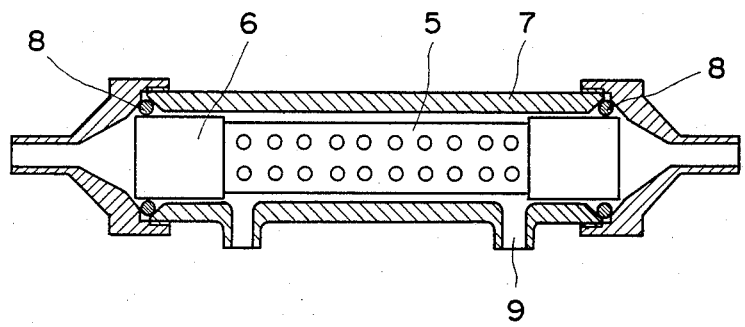
FIG. 4 is a diagrammatic side view illustrating how the hollow fiber semipermeable membrane element of FIG. 1 is incorporated in a housing of a module, the housing being shown in cross-section.

As illustrated in FIG. 2, hollow fiber semipermeable membranes (outer diameter: 1.2 mm, inner diameter: 0.7 mm) 1 made of an ethylene-tetrafluoroethylene copolymer (hereinafter often referred to as "ETFE") and having a length of 30 cm are attached, one by one, to a frame 2 made of stainless steel through a double-coated adhesive tape applied to the upper and lower sides of the frame 2. The upper side of the frame 2 having the membranes 1 attached thereto was dipped in the solution of the unvulcanized rubber, followed by drying at 80° C. for several minutes. This operation was repeated thrice to form a unvulcanized rubber coat at one end portions of the membranes 1. The lower side of the frame 2 was also treated in the same manner as mentioned above to form a unvulcanized rubber coat at the other end portions of the membranes 1. The membranes 1 were cut at their respective portions inside the upper and lower sides of the frame 2 to obtain hollow fiber semipermeable membranes 1 having their both end portions coated with the unvulcanized rubber (not shown). The thus obtained membranes 1 were bundled, with their both ends arranged uniformly, into a cylindrical form. Around the cylindrical membrane bundle 3 at its both end portions coated with the unvulcanized rubber was wound an unvulcanized rubber sheet 4, to form a cylindrical membrane bundle assembly as depicted in FIG. 3. Referring to FIG. 1, the thus obtained cylindrical membrane bundle assembly is fittedly inserted in a perforated pipe 5 having a length a little smaller than that of the cylindrical membrane bundle assembly so that the both end portions of the cylindrical membrane bundle assembly protruded out of the both ends of the pipe 5. Around the protruded both end portions of the cylindrical membrane bundle assembly and the both end portions of the pipe were wound unvulcanized rubber sheets 6, 6 which were the same as the sheet 4, and was then subjected to vulcanization of the unvulcanized rubber in a nitrogen atmosphere oven at 180° C. for 4 hours while being pressed in a split mold made of PTFE. After the vulcanization, the both ends of the hollow fiber semipermeable membranes are cut to open the both ends. Thus, there was obtained a hollow fiber semipermeable membrane element. Referring to FIG. 4, the semipermeable membrane element was accommodated in a housing 7 made of PTFE and sealed by means of an O-ring 8 made of a fluoro resin, thus providing a semipermeable module. The module was immersed in a bath of ethanol for 30 minutes to render the module hydrophilic. The ethanol in the bath was replaced by water, and an air pressure of 3 kg/cm$^2$ was applied to the module at its secondary opening 9. As a result, it was found that no leakage was observed between the hollow fiber semipermeable membranes or between the vulcanized VITON GF and the housing. On the other hand, even after the hollow fiber semipermeable membrane elements were separately immersed in 98% concentrated sulfuric acid at 80° C. for 7 days, and in MEK at 20° C. for 7 days, neither coloration of the liquid nor change in appearance of the membrane element was observed.

EXAMPLE 2

Hollow fiber semipermeable membrane elements were prepared in substantially the same manner as in Example 1, except that 15 weight parts of CEFBON CM (tradename of a graphite fluoride produced and sold by Central Glass Company, Ltd., Japan) were used in place of 15 weight parts of MT-CARBON BLACK. In substantially the same manner as described in Example 1, the immersion tests in 98% concentrated sulfuric acid were conducted for 7 days, with temperatures varied. The results with respect to coloration of the liquid are shown together with those of the membrane element of Example 1 in the following Table. The hardness of the bonding portions was measured in accordance with ASTM D676 (Shore D) to give 65, that is the same as the hardness measured with respect to the membrane element of Example 1.

TABLE

| | Immersion temperature | | | |
|---|---|---|---|---|
| | 80° C. | 100° C. | 120° C. | 140° C. |
| Example 1 | no coloration | colored to light yellow | colored to brown | colored to brown |
| Example 2 | no coloration | no coloration | no coloration | colored to light yellow |

As is apparent from the above results, the incorporation of a graphite fluoride is not only effective for considerably increasing the hardness of the bonding rubber portions as the MT-CARBON BLACK did, but also effective for greatly improving a resistance of the bonding rubber portions to sulfuric acid.

EXAMPLE 3

EP-33 (tradename of an ethylene-propylene rubber produced and sold by Nippon Gosei Gomu K.K., Japan) was dissolved in MEK at a weight ratio of 15:100 (EP-33 : MEK). In the resulting solution were dissolved, in terms of weight parts per 100 weight parts of the EP-33, 5 weight parts of zinc flower, 1 weight part of stearic acid, 15 weight parts of MT-CARBON BLACK, 7 weight parts of naphthene oil, 1 weight part of sulfur, and 0.5 and 1 weight parts respectively of vulcanizing agents M and T (both are products of Ouchi Shinko K.K., Japan, and mercaptobenzothiazole and tetramethylthiuram disulfide, respectively) to obtain a coating solution.

A hollow fiber semipermeable membrane element was produced in substantially the same manner as in Example 1, except that the above-obtained coating solution was used and that the vulcanization of rubber was effected in a steam atmosphere at 160° C. for 30 minutes. The test of immersion of the membrane element in MEK showed that neither coloration of the liquid nor change in hardness of the bonding rubber portions was observed.

EXAMPLE 4

In Example 1, as described, predetermined lengths of hollow fiber semipermeable membranes were attached, one by one, to the frame through a double-coated adhesive tape. After the semipermeable membranes were coated at their respective both end portions and dried, the membranes were cut at their respective portions inside the upper and lower sides of the frame to obtain hollow fiber semipermeable membranes having their both end portions coated with an unvulcanized rubber. The thus obtained membranes 1 were bundled, with their both ends arranged uniformly, into a cylindrical form. The procedure is somewhat troublesome and need a long period time.

In this Example, there was employed another method for preparing a cylindrical membrane bundle composed of hollow fiber semipermeable membranes with their both ends arranged properly. Referring to FIG. 5, a hollow fiber semipermeable membrane 1 was wound around a frame 2 over its upper and lower sides so that the hollow fiber semipermeable membranes 1 were densely arranged substantially in parallel at predetermined intervals. The frame 2 with the membrane wound therearound was dipped from its upper side in the same coating solution as used in Example 1 to a depth of 50 mm, thereby to coat one end portions of the semipermeable membranes with the unvulcanized rubber, followed by drying at 80° C. for several minutes. The operation was repeated three times to form a coating of 0.3 mm in thickness. With respect to the lower side of the frame 2, the same treatment was effected to coat the other end portions of the semipermeable membranes with dried unvulcanized rubber. The membranes 1 were cut at their respective portions inside the upper and lower sides of the frame 2 to obtain a sheet-like form of a vast plurality of hollow fiber semipermeable membranes bonded together at their end portions by means of the dried unvulcanized coating rubber 10 as shown in FIG. 6. By rolling the sheet-like hollow fiber semipermeable membranes as illustrated in FIG. 6, a cylindrical membrane bundle composed of semipermeable membranes of which the end portions are properly arranged could be obtained in a period of time as short as about 1/5 that in Example 1.

The thus obtained cylindrical membrane bundle composed of semipermeable membranes with their end portions coated with the unvulcanized rubber is subjected to vulcanization of the unvulcanized rubber in substantially the same mannar as described in Example 1, to obtain a hollow fiber semipermeable membrane element.

In substantially the same manner as described in Example 1, the leakage test was conducted. As a result, it was found that no leakage was observed between the hollow fiber semipermeable membranes or between the vulcanized rubber and the housing.

What is claimed is:

1. A hollow fiber semipermeable membrane element comprising a plurality of hollow fiber semipermeable membranes substantially equal in length, arranged in a lengthwise direction and bonded together by means of vulcanizing an unvulcanized rubber coated on individual hollow fiber semipermeable membranes at their end portions.

2. A hollow fiber semipermeable membrane element according to claim 1, wherein said vulcanized rubber contains a graphite fluoride in an amount of 1 to 100% by weight based on the weight of the rubber value of said vulcanized rubber.

* * * * *